G. FRIEDBERG
ELASTIC WHEEL.
APPLICATION FILED OCT. 1, 1908.

953,327.

Patented Mar. 29, 1910.

Witnesses.
Jesse N. Lutton.
R. V. Sommers.

Inventor.
Guido Friedberg
by Henry Orth
Atty.

UNITED STATES PATENT OFFICE.

GUIDO FRIEDBERG, OF WIELICZKA, AUSTRIA-HUNGARY, ASSIGNOR OF TWO-THIRDS TO KONSTANTY KOTWINSKI, OF WIELICZKA, AUSTRIA-HUNGARY, AND FRANZ DROBNIAK, OF BRZESZCZE, AUSTRIA-HUNGARY.

ELASTIC WHEEL.

953,327.     Specification of Letters Patent.     Patented Mar. 29, 1910.

Application filed October 1, 1908. Serial No. 455,722.

*To all whom it may concern:*

Be it known that I, GUIDO FRIEDBERG, a subject of the Emperor of Austria-Hungary, residing at Wieliczka, in Galicia, Austria-Hungary, have invented certain new and useful Improvements in Elastic Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an elastic wheel, and consists of a frame arranged to slide within the nave of the wheel, and provided with sliding surfaces for the square part of the wheel axle and which is maintained in the central position in the nave of the wheel by elastic bodies and itself contains elastic bodies which maintains the square part of the wheel axle in the central position. The mutual displacement of the axle in relation to the frame, and of the frame in relation to the nave, which are thus rendered possible, insures that in all positions of the wheel the pressure and the shocks are accurately directed axially on the elastic bodies. The elastic bodies employed may consist of springs, preferably volute springs.

The accompanying drawings illustrate a wheel constructed in accordance with this invention.

Figure 1:
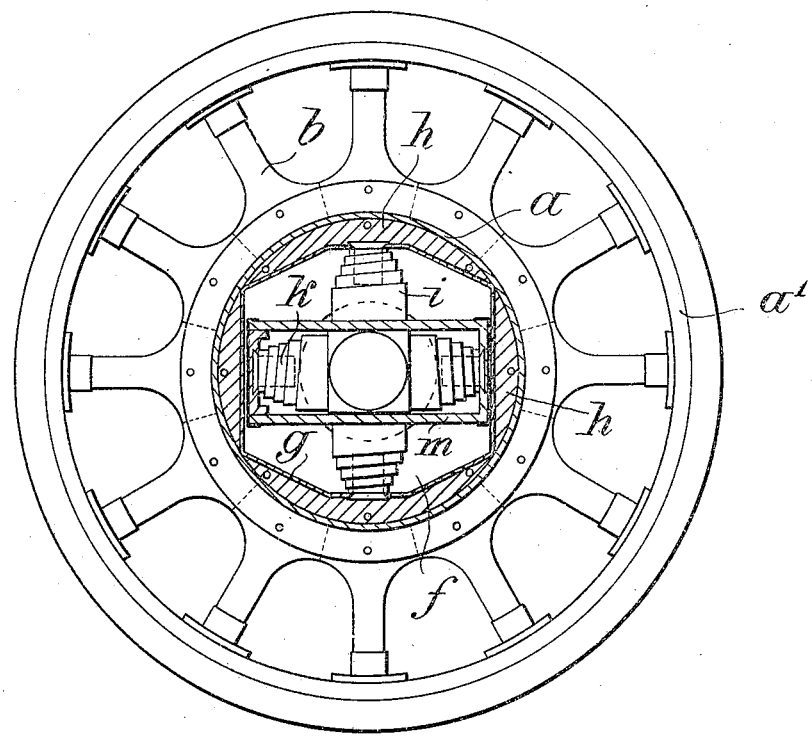
Figure 2:
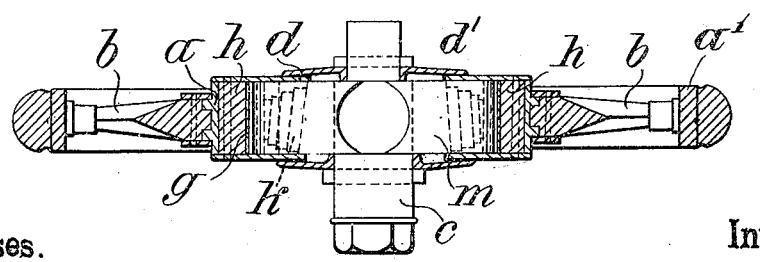

Figure 1 is a side view of the nave and the sliding frame arranged therein, partly in section; and Fig. 2 is a horizontal cross section of the same.

The hub or nave $a$ of the wheel is connected to the felly $a'$ by means of spokes $b$, and within the nave is mounted a bushing $h$ surrounding a casing $g$ which constitutes the walls of a nave-box $f$ preferably polygonal in form. In the box $f$ is mounted an oblong frame $m$, the short sides, hereinafter called the ends, abutting against opposite walls of the nave-box; said ends being shorter than the walls to permit lateral movement of the frame in the box. Between the long sides of the frame and the opposing parallel sides of the nave-box are interposed volute springs $i$, the opposite ends of which bear against the sides of the box and frame and resiliently hold the latter centrally of the nave-box. The frame forms a bearing for the axle $c$, the ends of which are made square and rest against the long sides of the frame, and interposed between the ends of the frame and the opposing faces of the axle are volute springs $k$ the ends of which bear against said ends and faces and resiliently hold the axle centrally of the frame.

As will be readily understood from the foregoing description, the springs $i$ and $k$ absorb the shock imparted to the wheel from road.

The sides of the box are preferably provided with annular plates $d$ bolted or otherwise secured to the hub or bushing and provided with a central aperture of sufficient diameter to allow for the movements of the axle and frame within the nave-box, and the apertures of the plates $d$ are closed by disks $d'$ mounted on the axle outside of the plates.

I claim—

A wheel comprising a bushing mounted within the nave of the wheel forming a polygonal box, an oblong frame having its ends slidably mounted on opposite walls of the box, volute springs abutting against the sides of the frame and opposite walls of the box; in combination with a square axle mounted in and slidable on the sides of the frame, volute springs abutting against the sides of the axle and the ends of the frame, an annular plate secured to the nave adapted to permit movement of the axle and frame in the box, and a plate secured to the axle to close the aperture in the annular plate.

In testimony that I claim the foregoing as my invention, I have signed my name in presence of two subscribing witnesses.

GUIDO FRIEDBERG.

Witnesses:
    SAMUEL KLATSCHKS,
    ROBERT W. HEINGARTNER.

It is hereby certified that the name of the first-mentioned assignee in Letters Patent No. 953,327, granted March 29, 1910, upon the application of Guido Friedberg, of Wieliczka, Austria-Hungary, for an improvement in "Elastic Wheels" was erroneously written and printed "Konstanty Kotwinski" whereas said name should have been written and printed *Konstanty Slotwinski;* and that the proper corrections have been made in the files and records of the Patent Office and are hereby made in said Letters Patent.

Signed and sealed this 14th day of June, A. D., 1910.

[SEAL.]

C. C. BILLINGS,
*Acting Commissioner of Patents.*